United States Patent [19]

Holst

[11] Patent Number: 4,785,385
[45] Date of Patent: Nov. 15, 1988

[54] TRAFFIC LIGHT LENS

[75] Inventor: Barrie J. Holst, Rydalmere, Australia

[73] Assignee: Awa Limited, North Ryde, Australia

[21] Appl. No.: 51,630

[22] PCT Filed: Aug. 6, 1986

[86] PCT No.: PCT/AU86/00222
§ 371 Date: Apr. 2, 1987
§ 102(e) Date: Apr. 2, 1987

[87] PCT Pub. No.: WO87/00908
PCT Pub. Date: Feb. 12, 1987

[30] Foreign Application Priority Data

Aug. 6, 1985 [AT] Austria .................. PH1806

[51] Int. Cl.$^4$ ............................. F21V 7/00
[52] U.S. Cl. ..................... 362/309; 362/337
[58] Field of Search .......... 362/337, 309, 340, 339, 362/311

[56] References Cited

U.S. PATENT DOCUMENTS 3,267,278 8/1966 Doolittle ..................... 362/309
4,484,254 11/1984 Puckett et al. ............... 362/340

FOREIGN PATENT DOCUMENTS

50868/73 3/1974 Australia .
4498785 1/1986 Australia .
110583 2/1962 Fed. Rep. of Germany .
801422 8/1936 France .
1030512 6/1953 France ..................... 362/337
463499 4/1937 United Kingdom .
105681 3/1968 United Kingdom .

Primary Examiner—Charles J. Myhre
Assistant Examiner—David A. Okonsky
Attorney, Agent, or Firm—Oblon, Fisher, Spivak, McClelland & Maier

[57] ABSTRACT

A lens (16) suitable for use with traffic lights has a body portion (20) that is a segment of a sphere and a mounting or sealing ring (21) at the periphery of the body portion. An array of lenticular elements (22) is formed on the concave inner surface of the body portion (20) and is arranged in rows extending substantially horizontally across the concave inner surface of the body portion of the lens. Between each adjacent lenticular element there is a recess (25) to modify the reflection pattern of the lens.

10 Claims, 7 Drawing Sheets

TRAFFIC LIGHT LENS

FIELD OF INVENTION

This invention relates to a lens suitable for use with traffic lights.

BACKGROUND ART

A traffic light normally consists of a housing, a parabolic reflector in the housing, a light source at the focus of the reflector and a lens which overlies the light source and reflector. The purpose of the parabolic reflector is to direct light from the source as a generally horizontal beam and the purpose of the lens is to distribute the transmitted light at a required intensity over a specified pattern.

Conventional traffic light lenses are usually moulded from a polycarbonate material to provide a body portion that is a segment of sphere and a mounting or sealing rim at the periphery of the body portion. An array of lenticular elements is formed on the concave inner surface of the body portion with each lenticular element being so shaped as to direct downwardly a portion of the horizontal beam from the reflector.

The construction and physical dimensions of the light source, the reflector and the holder for the light source as well as the colour of the lenses are virtually fixed by previous design and field compatability which is determined by local government user authorities.

The manufacturer is therefore obliged to achieve the high optical performance requirements within the little flexibility that may be gained in innovative lens design or the blending of lenses within specified chromaticity limits. In essence, lens design involves and optimisation of the sometimes conflicting requirements of diffusion, distribution, intensity and colour given a fixed light source.

The lens is, in fact, a refractor and, in Australia, its optical performance is specified by Australian Standard AS2144-1978 and various local government user specifications.

The required distribution of luminous intensity for traffic lights is set forth in table 3.1 of the above Australian Standard. The critical areas of this specification are the off-axis requirements. For red and green signals, the minimum distribution intensity 15° down from the beam axis is 15 candelas at 25° to the left and right of the beam axis. For yellow lights, the required intensity at these points is 45 candelas.

Prior art moulded lenses have an array of lenticular elements each of which has a light receiving surface that is formed as a portion of a section of a torroid The lenticular elements are arranged in rows that extend generally horizontally accross the concave inner surface of the body portion of the lens. Although such an array is usually effective to provide the required distribution pattern, the intensity of the emerging light is reduced by the thickness of the lens body and the lenticular elements.

DISCLOSURE OF INVENTION

It is an object of this invention to provide an improved lens suitable for use with traffic lights that provides an improved distribution of luminous intensity at positions down from and to the left and right of the beam axis.

According to the invention there is provided a lens suitable for use with traffic lights comprising a body portion that is a segment of a sphere, and an array of lenticular elements formed on the concave inner surface of the body portion arranged in rows extending substantially horizontally across the concave inner suface of the body portion of the lens, characterised in that there is provided between each adjacent lenticular element a recess in the body portion.

The recesses or dimples effectively reduce the wall thickness of the body portion of the lens to increase the abovementioned light transmission to the critical luminous test points. The use of the recesses provides added light transmission without affecting the light diffusion characteristics of the lens.

In a preferred form of the invention there is a planar portion between the upper extremity of each lenticular element and the adjacent recess to increase the horizontal portion of the beam from the lens.

BRIEF DESCRIPTION OF THE DRAWINGS

In order that the invention may be more readily understood, and put into practical effect, reference will now be made to the accompanying drawings in which.

BEST MODE OF CARRYING OUT THE INVENTION

Figure 1:
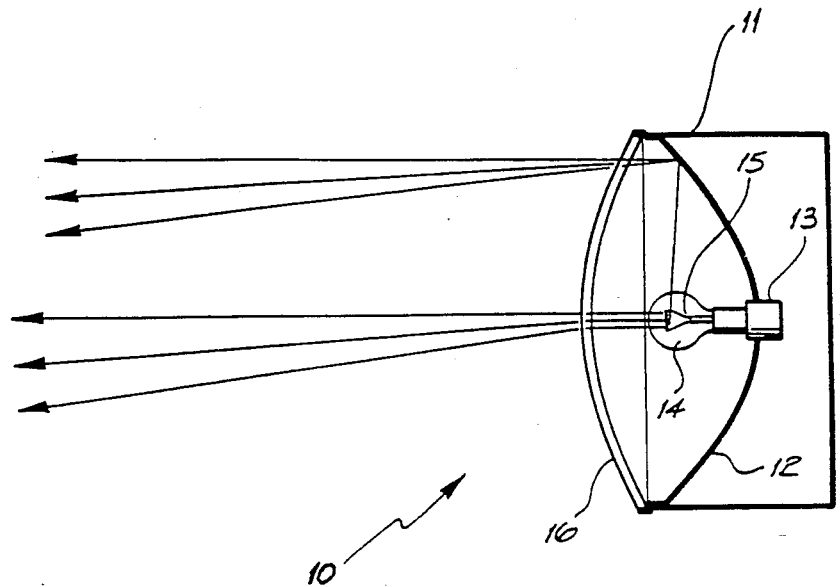
FIG. 1 is a transverse sectional view of a traffic light housing according to the prior art.

The prior art traffic light 10 shown in FIG. 1 includes a box-like housing 11 having an open front face in which is mounted a parabolic reflector 12. A lamp holder 13 supported by the reflector 12 has a lamp 14 the filament (or light source) 15 of which is located at the focus of the reflector 12. Light from the source 15 is directed by the reflector 12 into a generally horizontal beam as shown in FIG. 1.

The lens or refractor 16 overlies the reflector 12 and light source 15 and is sealed at its circumference to the reflector 12 and the housing 11. The lens 16 refracts the light direct from the light source 15 and that reflected by the parabolic reflector 12 into the pattern shown in FIG. 1. It will be noted, that the beam is directed slightly downwardly from the horizontal axis of the light beam.

Figure 2:
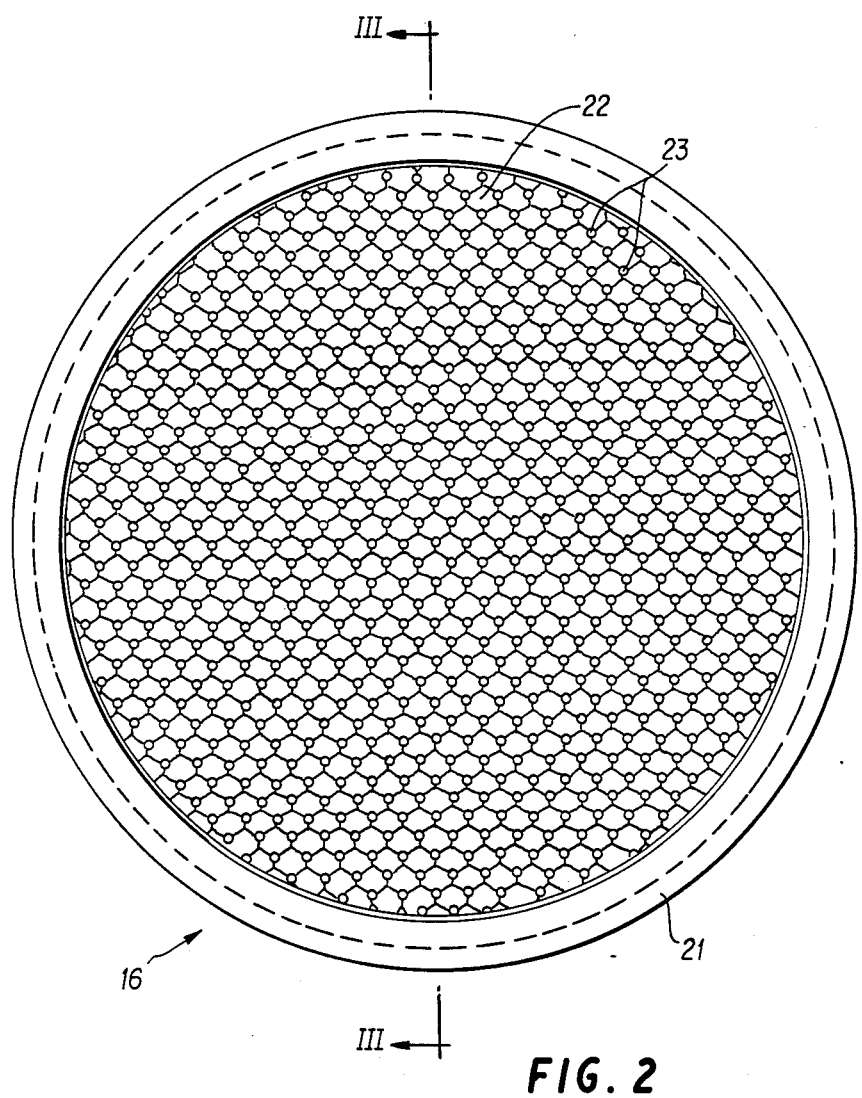
FIG. 2 is a rear elevation view of a lens according to one embodiment of the present invention.
Figure 3:
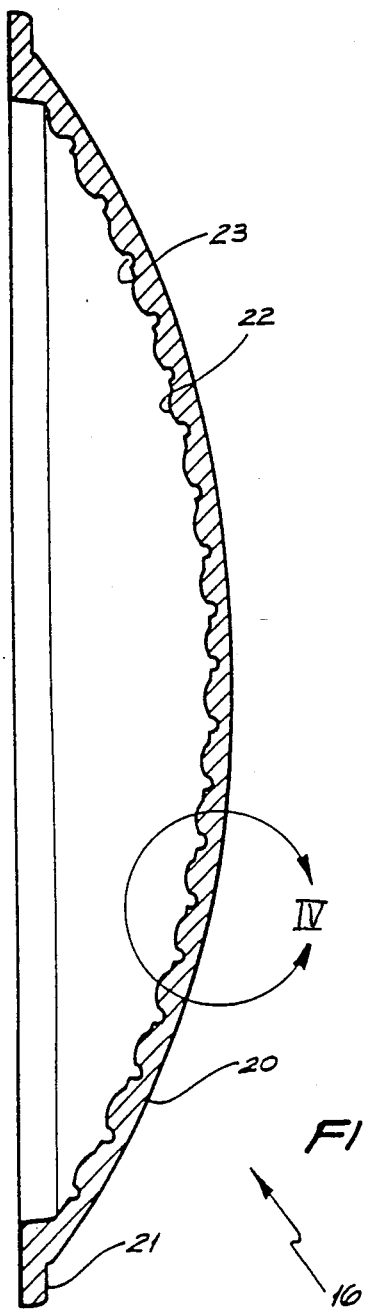
FIG. 3 is a vertical section taken along lines III—III of FIG. 1.
Figure 4:
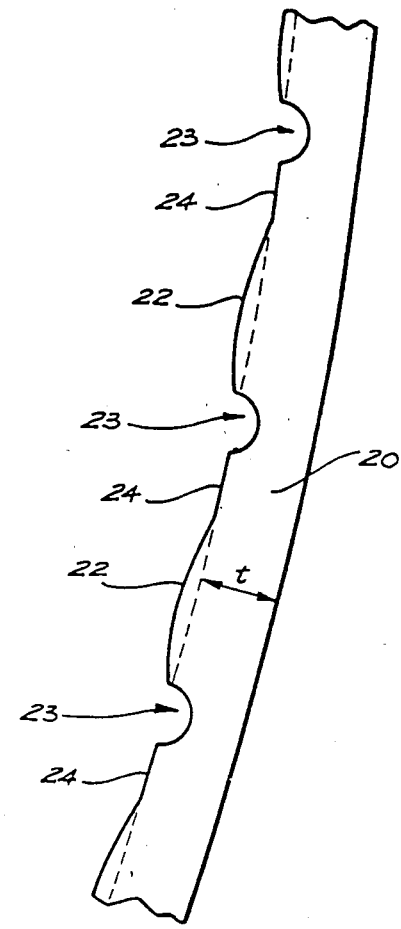
FIG. 4 is an enlarged sectional view of the portion IV of FIG. 3.

The lens or refractor 16 is shown in detail in FIGS. 2, 3 and 4. The refractor 16 is moulded from a polycarbonate material to provide a body portion 20 that is a segment of a sphere and a mounting or sealing rim 21 by means of which the lens is sealed to the reflector 12 and the housing 11. On the inner concave surface of the body portion 20 there is formed an array of lenticular elements 22 which are arranged in rows that extend generally horizontally across the lens. The pattern of the lenticular elements can be seen in FIG. 3 which is a simplified cross-section in that the pattern of the lenticular elements beyond the plane of section are not shown.

The body portion of the lens 16 has a thickness "t" as shown in FIG. 4 with the array of lenticular elements being formed on the body portion to make the lens thicker at the location of the lenticular elements.

The increased transmission and light distribution of the lens construction according to the invention arises from the provision of recesses 23 in between the lenticular elements 22. In this instance, the recesses are of semi-spherical form and are 2 mm in diameter. The recesses extend from the concave inside surface of the lens body approximately 1.5 mm and are relatively smaller than the lenticular elements 22. As indicated in FIG. 4, the recesses effectively reduce the wall thickness of the lens, thus increasing the light transmission to the critical luminous test points required by standard specification AS2144.

As can be seen in FIG. 4, the repeating pattern of the lenticular elements and recesses in vertical section consists of a lenticular element 22 formed as additional material to the body thickness "t", a planar face 24 of the body portion 20 parallel to an outer surface of the body portion 20 and the curved recess 23.

Figure 7:
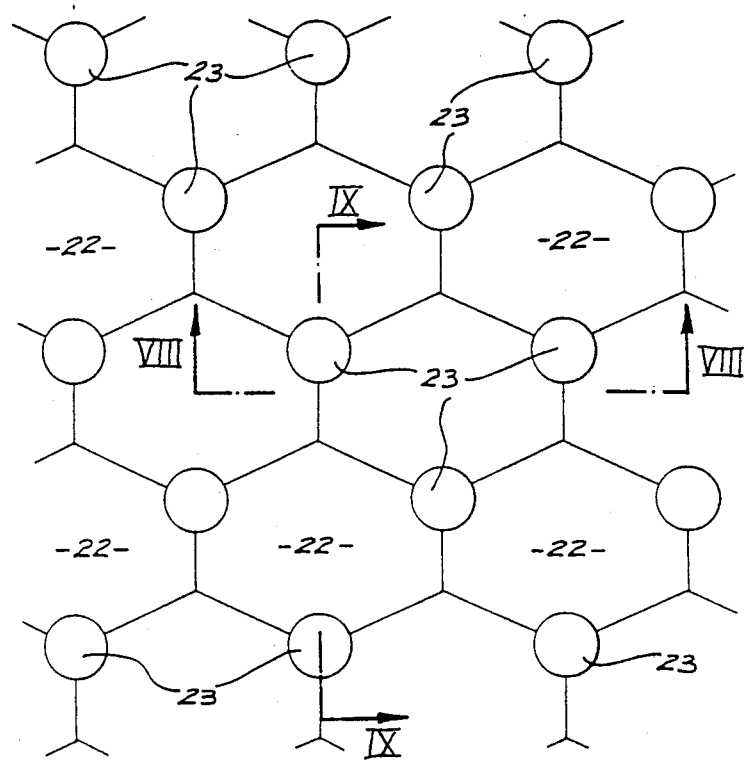
FIG. 7 is an enlarged plan view of several lenticular elements and associated recesses.
Figure 8:
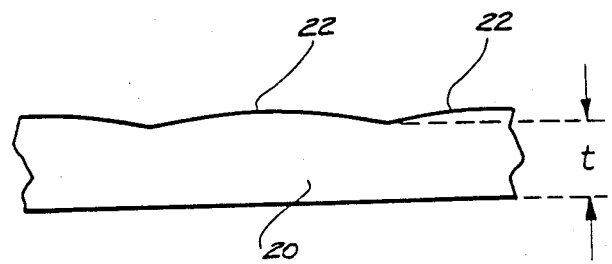
FIG. 8 is a view taken along lines VIII—VIII of FIG. 7.
Figure 9:
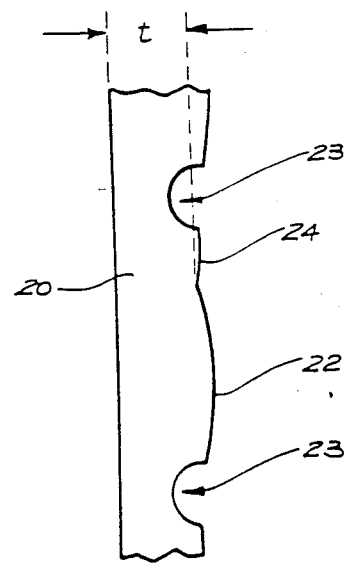
FIG. 9 is a view taken along lines IX—IX of FIG. 7.

In plan, the repeating pattern consists of a recess 23 between each adjacent lenticular element 22 of each horizontal row of elements 22 as can be seen in FIG. 7. Each recess 23 is positioned at the upper corners of the adjacent elements 22.

Figure 5:
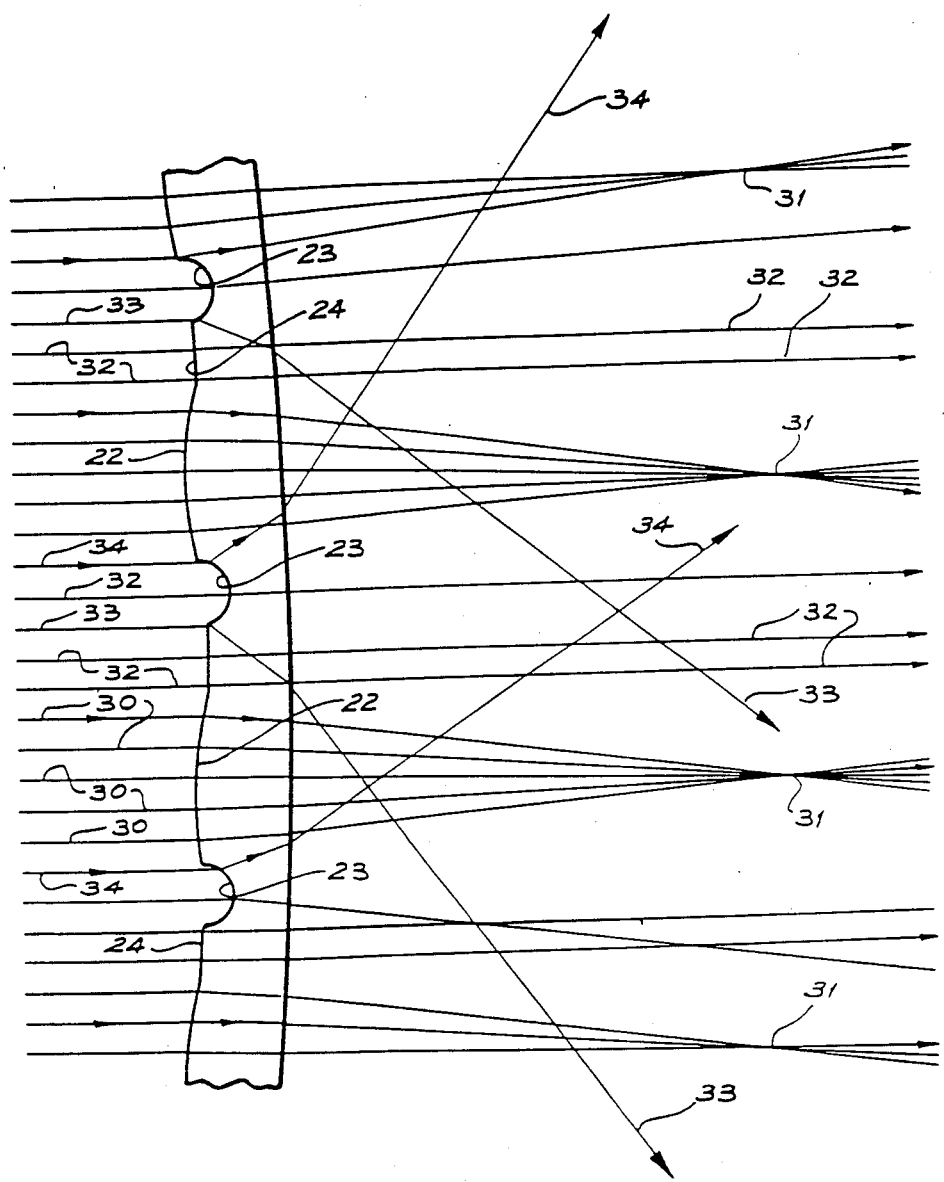
FIG. 5 is a sectional view of the refraction pattern of the lens taken in a vertical plane containing the optical axis.

The refraction pattern in the vertical plane of the lens 16 is shown in FIG. 5. The rays 30 which passes through the lenticular elements 22 coverge towards a focus 31 and the rays 32 which are directed to the planar inner surface 24 as well as those directed to the centre of the recess 23 emerge as substantially horizontal to increase the luminous intensity of the beam along its horizontal axis.

The rays 33 which are directed to the lower portion of each recess 3 are refracted downwardly to increase the luminous intensity at the critical positions mentioned above. The rays 34 which are directed to the upper portion of each recess 23 are directed upwardly and, upon modification of the configuration of the recess could be redirected.

Figure 6:
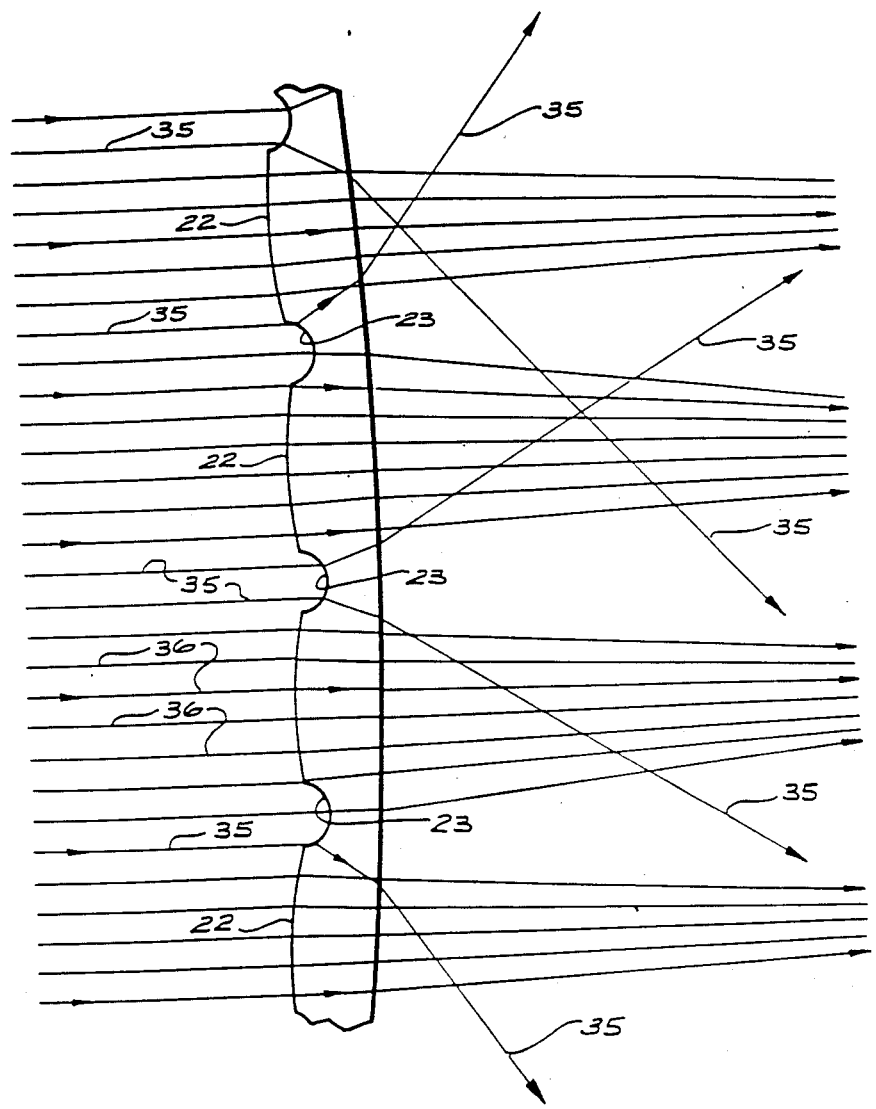
FIG. 6 is a sectional view of the refraction pattern of the lens taken in a horizontal plane containing the optical axis.

The refraction pattern in the horizontal plane is shown in FIG. 6. Rays 35 which are directed to extremities of the recesses 23 are refracted away from the axis of the beam and rays 36 which pass through the lenticular elements are refracted toward one another.

The efficacy of a lens structure made in accordance with the invention compared with that of a prior art lens in shown in the following table:

TABLE 1

DIRECTIONAL INTENSITIES IN CADELAS AT 240 v, CORRECTED TO A NOMINAL OUTPUT OF LAMP OF 500 LUMENS AT 250 v.

| TEST POINTS | | PRIOR ART | | | INVENTION | | |
|---|---|---|---|---|---|---|---|
| (a) | (b) | R | Y | G | R | Y | G |
| 0 | 0 | 292 | 663 | 232 | 295 | 746 | 317 |

TABLE 1-continued

DIRECTIONAL INTENSITIES IN CADELAS AT 240 v, CORRECTED TO A NOMINAL OUTPUT OF LAMP OF 500 LUMENS AT 250 v.

| TEST POINTS | | PRIOR ART | | | INVENTION | | |
|---|---|---|---|---|---|---|---|
| (a) | (b) | R | Y | G | R | Y | G |
| 15 | 25R | 14 | 32 | 12 | 17 | 44 | 19 |
| 15 | 25L | 15 | 38 | 13 | 18 | 45 | 20 |

LEGEND
R — RED
Y — YELLOW
G — GREEN
(a) - degrees down from beam axis
(b) - degrees left (L) and right (R) from beam axis It will be noted that the straight-through intensity is greatly improved as is the intensity at 15° down from the beam axis both to the left and right.

Various modifications may be made in details of design and construction without departing from the scope and ambit of the invention.

1. A lens suitable for use with traffic lights comprising a body portion that is a segment of a sphere and an array of lenticular elements formed on a concave inner surface of the body portion arranged in rows extending substantially horizontally across the concave inner surface of the body portion of the lens, characterized in that there is provided between each adjacent lenticular element a relatively smaller recess in the body portion wherein each relatively smaller recess is of semi-spherical form.

2. A lens according to claim 1 wherein a planar portion is formed between an upper extremity of each lenticular element and an adjacent recess.

3. A lens according to claim 1 and further including a mounting or sealing ring at the periphery of the body portion.

4. A lens according to claim 1 wherein the body portion is of a predetermined thickness, the lenticular elements are formed on the concave inner surface as additional material to the body portion and each said recess is formed into the body portion.

5. A lens according to claim 1 wherein each said recess is positioned at the upper corners of adjacent lenticular elements.

6. A lens accordin9 to claim 1 wherein each said recess is so shaped that light rays directed to the centre of each recess emerge substantially horizontal.

7. A lens according to claim 1 wherein each said recess is so shaped that light rays directed to the lower portion of each recess are refracted downwardly.

8. A lens according to claim 1 wherein each said recess is so shaped that light rays directed to the upper portion of each said recess are refracted upwardly.

9. A lens according to claim 1 wherein light rays directed to the lateral extremities of each said recess is refracted away from the axis of each said recess.

10. A lens suitable for use with traffic lights comprising a body portion that is a segment of a sphere and an array of lenticular elements formed on a concave inner surface of the body portion arranged in rows extending substantially horizontally across the concave inner surface of the body portion of the lens, characterized in that there is provided between each adjacent lenticular element a relatively smaller recess in the body portion wherein a planar portion is formed between an upper extremity of each lenticular element and an adjacent recess, said planar portion being parallel to an outer surface portion of said body portion.

* * * * *